United States Patent
Brochard et al.

(10) Patent No.: US 11,746,705 B2
(45) Date of Patent: Sep. 5, 2023

(54) METHOD FOR MANUFACTURING AN ACOUSTIC ELEMENT OF A SOUND ABSORPTION STRUCTURE FROM AT LEAST ONE SHEET OF MATERIAL

(71) Applicant: Airbus Operations S.A.S., Toulouse (FR)

(72) Inventors: Wolfgang Brochard, Carbonne (FR); Laurent Cazeaux, Toulouse (FR); Claire Maffre, Lias (FR)

(73) Assignee: Airbus Operations S.A.S.

( * ) Notice: Subject to any disclaimer, the term of this patent is extended or adjusted under 35 U.S.C. 154(b) by 898 days.

(21) Appl. No.: 16/682,271

(22) Filed: Nov. 13, 2019

(65) Prior Publication Data
US 2020/0165975 A1 May 28, 2020

(30) Foreign Application Priority Data
Nov. 28, 2018 (FR) ...................... 18 71984

(51) Int. Cl.
*F02C 7/24* (2006.01)
*B64D 29/00* (2006.01)
*G10K 11/168* (2006.01)

(52) U.S. Cl.
CPC ............... *F02C 7/24* (2013.01); *B64D 29/00* (2013.01); *G10K 11/168* (2013.01); *F05D 2260/96* (2013.01)

(58) Field of Classification Search
CPC ... F05D 2260/96; G10K 11/168; B64D 29/00; F02C 7/24
USPC .......................................... 181/222
See application file for complete search history.

(56) References Cited

U.S. PATENT DOCUMENTS

| 5,315,820 A | 5/1994 | Arnold |
| 5,462,331 A | 10/1995 | Stief et al. |
| 8,381,872 B2 * | 2/2013 | Alexander ........... G10K 11/162 52/145 |

(Continued)

FOREIGN PATENT DOCUMENTS

| FR | 3055662 A1 | 3/2018 |
| RU | 179829 U1 | 5/2018 |

OTHER PUBLICATIONS

"Aero-acoustic liner applications of the broadband special acoustic absorber concept", American Institute of Aeronautics and Astronautics, AIAA 2013-2176, 19th AIAA/CEAS Aeroacoustics Conference, May 27-29, 2013, Berlin, Germany.

(Continued)

*Primary Examiner* — Forrest M Phillips
(74) *Attorney, Agent, or Firm* — Lerner David LLP

(57) ABSTRACT

A method for manufacturing an acoustic element of a sound absorption structure including at least one cylindrical, conical or truncated conical chamber obtained from a flat preform shaped and then assembled in order to obtain the cylindrical, conical or truncated conical shape of the chamber. This manufacturing method makes it possible to obtain an acoustic element that has thin walls and is made from a material suited to its environment. An acoustic element obtained using the manufacturing method, a sound absorption structure comprising at least one such acoustic element and an aircraft powerplant comprising at least one such structure are also described.

21 Claims, 8 Drawing Sheets

(56) References Cited

U.S. PATENT DOCUMENTS

| | | | | |
|---|---|---|---|---|
| 8,636,107 | B2* | 1/2014 | Moutier | B29C 73/26 |
| | | | | 29/402.09 |
| 9,704,467 | B1* | 7/2017 | Nampy | F02C 7/24 |
| 9,962,851 | B2* | 5/2018 | Slama | B26F 3/10 |
| 10,414,481 | B2* | 9/2019 | Pierick | B64D 33/00 |
| 2012/0244314 | A1* | 9/2012 | Scheibner | B01D 37/00 |
| | | | | 428/137 |
| 2013/0071589 | A1* | 3/2013 | Hannington | B32B 27/32 |
| | | | | 264/293 |
| 2013/0186707 | A1* | 7/2013 | Richter | F02K 1/827 |
| | | | | 181/292 |
| 2017/0225764 | A1* | 8/2017 | Nampy | B64C 1/066 |
| 2017/0229106 | A1* | 8/2017 | Nampy | G10K 11/168 |
| 2019/0054999 | A1* | 2/2019 | Narayanan Nampy | |
| | | | | B64D 29/00 |

OTHER PUBLICATIONS

Anoshkin et al., Database WPI Week 201845 Thomson Scientific. London. GB; AN 2018-51480A XP002793287 (2017) & RU 179 829 U1 (Anoshkin A N) (May 25, 2018).

FR 18 71984 Search Report dated Jul. 30, 2019.

Co-pending U.S. Appl. No. 16/682,252, filed Nov. 11, 2019.

\* cited by examiner

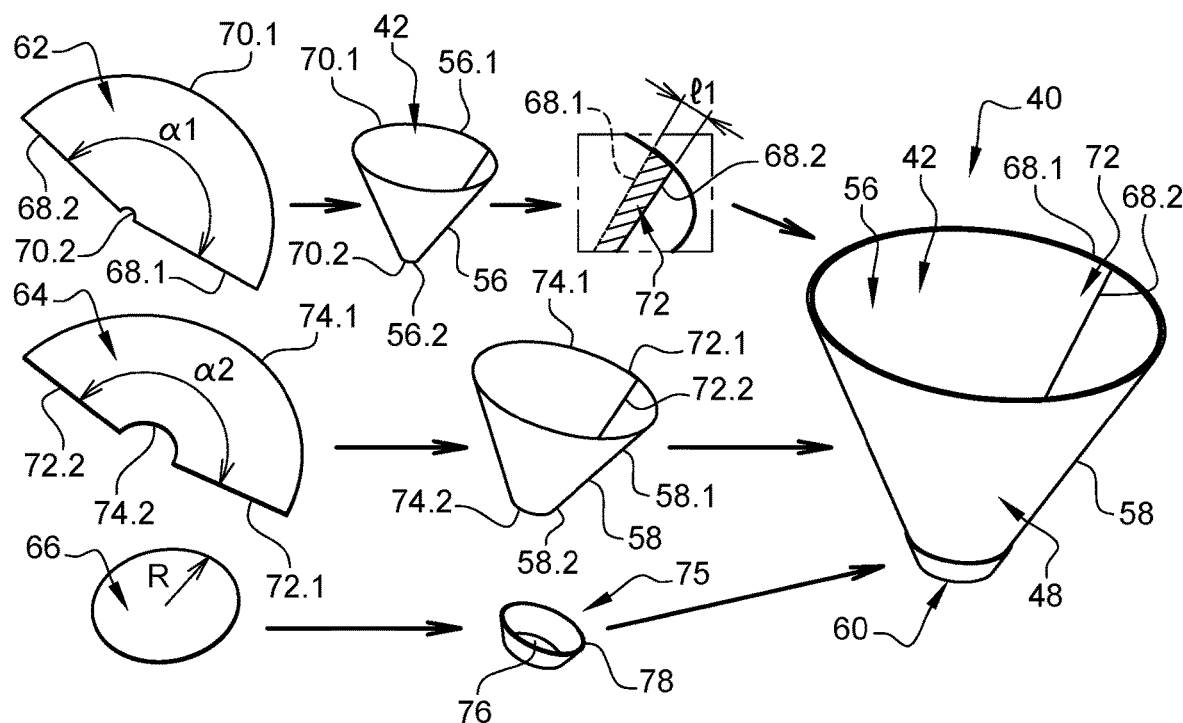
Fig. 4
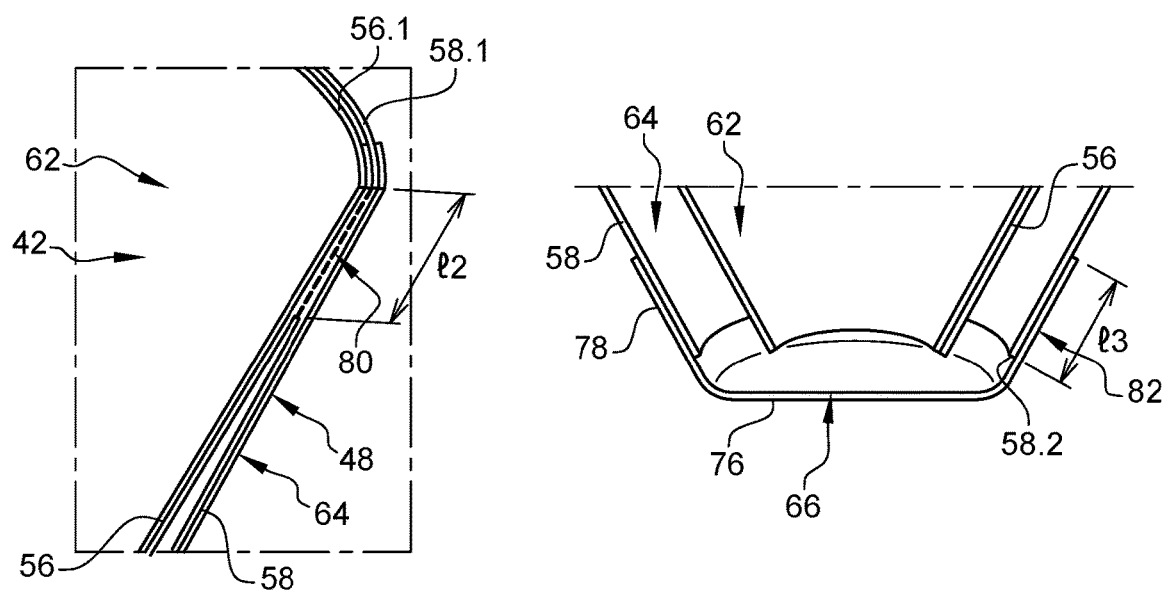
Fig. 5
Fig. 6

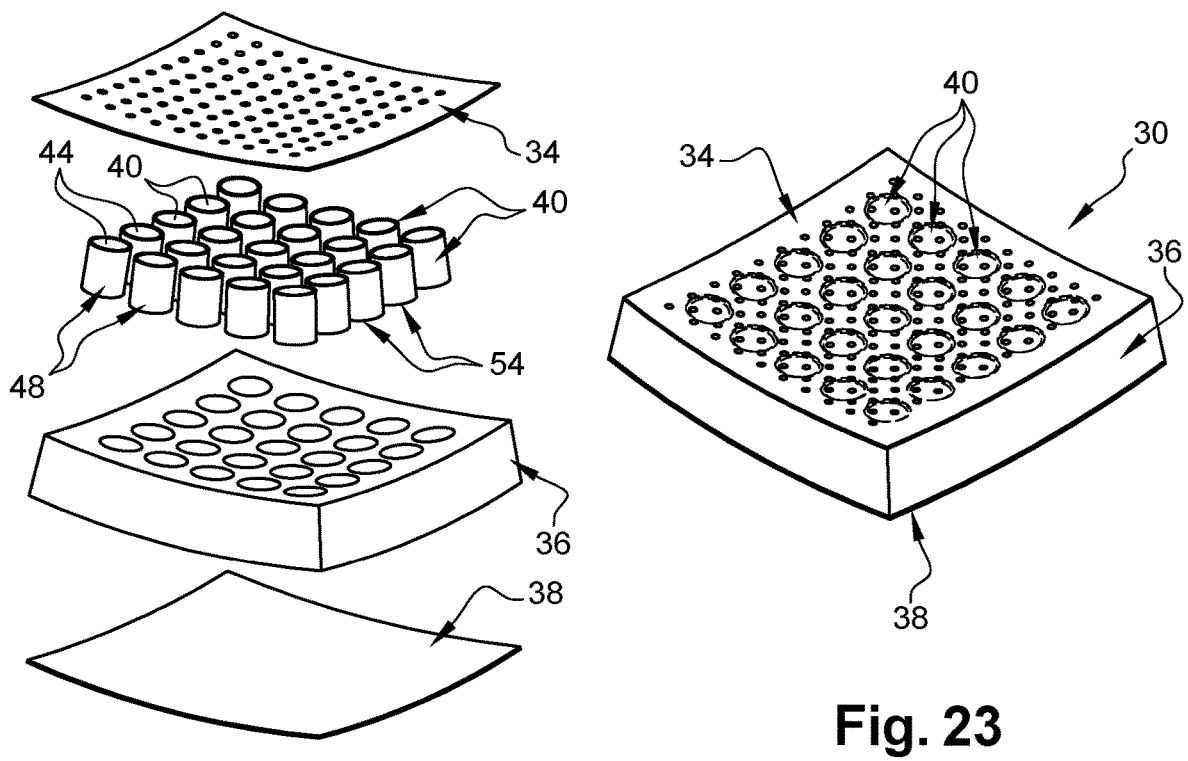
Fig. 22
Fig. 23
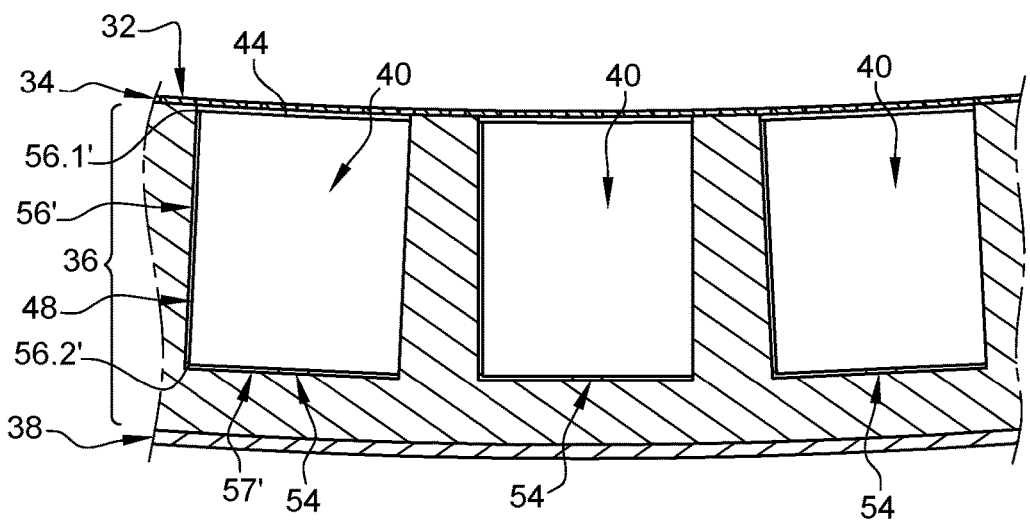
Fig. 24

METHOD FOR MANUFACTURING AN ACOUSTIC ELEMENT OF A SOUND ABSORPTION STRUCTURE FROM AT LEAST ONE SHEET OF MATERIAL

FIELD OF THE INVENTION

The present application relates to a method for manufacturing an acoustic element of a sound absorption structure from a sheet of material, an acoustic element of a sound absorption structure obtained using said method, a sound absorption structure comprising at least one such acoustic element and a powerplant including such a sound absorption structure.

BACKGROUND OF THE INVENTION

According to a configuration of the prior art, a powerplant comprises a nacelle together with a dual-flow turbine engine positioned inside the nacelle. Some surfaces of the nacelle and the turbine engine comprise sound absorption structures to attenuate noise annoyance. According to one configuration, a sound absorption structure comprises a porous layer, a honeycomb cellular layer and a reflective layer.

A UHBR (Ultra High Bypass Ratio) turbine engine has a fan rotating at lower frequencies than some turbine engines currently on the market, so that the sound absorption structures must be configured to attenuate low-frequency sound waves. To attenuate such sound waves, the honeycomb cellular layer must be very deep, which has a detrimental effect in terms of weight, space requirement and manufacturing.

A sound absorption structure that makes it possible to absorb low-frequency sound waves is described in the document "Aero-acoustic liner applications of the broadband special acoustic absorber concept", American Institute of Aeronautics and Astronautics, AIAA 2013-2176, 19th AIAA/CEAS Aeroacoustics Conference, May 27-29, 2013, Berlin, Germany. It comprises a plurality of capsules closed by a skin in contact with the medium in which the sound waves propagate so that they each define a cavity in which a hollow cone is positioned, away from the capsule, that has a base that opens onto the skin. Each cone comprises at least one acoustic orifice, making it possible to connect the inside of the cone with the space between the cone and the capsule, positioned and sized depending on the acoustic characteristics sought. In addition, the skin is porous at least over each cone.

A sound absorption structure formed in this way, based on the same principle as a Helmholtz resonator and a quarter-wave resonator, makes it possible to effectively attenuate the low-frequency sounds emitted by a UHBR turbine engine.

According to one configuration, the capsules and cones are made, by moulding, from a short-fibre-reinforced resin or unreinforced resin. The mechanical characteristics and weight of this embodiment are not entirely satisfactory.

BRIEF SUMMARY OF THE INVENTION

Aspects of the present invention may overcome all or some of the drawbacks of the prior art.

An aspect of the invention relates to a method for manufacturing an acoustic element of a sound absorption structure comprising at least one chamber having a cylindrical, conical or truncated conical shape, characterized in that the method comprises a step of cutting at least one preform out of a plate or sheet of material, a step of shaping the preform by rolling and a step of assembling two side edges of the preform to obtain the cylindrical, conical or truncated conical shape of the chamber.

The manufacturing method according to an aspect of the invention makes it possible to obtain thin-walled chambers, which makes it possible to reduce the weight on board. According to another advantage, it can be implemented using plates or sheets with a variety of materials so that the acoustic elements can be made from materials suited to their environments.

According to another feature, the manufacturing method comprises a step of cutting at least one series of slits in the flat preform, before the step of shaping said preform.

According to another feature, the slits are approximately positioned in planes containing the axis of rolling of the preform when said preform is shaped and extend from a curved edge of the preform.

According to another feature, the slits extend from a concave curved edge of the preform and define first tabs. In addition, the manufacturing method comprises a step of folding the first tabs, after the steps of shaping and assembling the preform, and a step of joining the first tabs so that a bottom wall of the chamber is obtained.

According to another feature, the preform comprises a first series of first slits that extend from a convex curved edge of the preform.

According to another feature, the preform comprises a second series of second slits that extend from a convex curved edge of the preform so that they define second tabs. In addition, the manufacturing method comprises a step of cutting, shaping and assembling the preform so that a first chamber is obtained, a step of positioning the first chamber in a second chamber including a second side wall that has a first edge and a step of folding the second tabs, around the first edge of the second side wall, to press them against an outer face of the second wall of the second chamber in order to obtain an assembly of the first and second chambers.

According to another feature, the manufacturing method comprises a step of obtaining at least one hole in the flat preform, before the step of shaping said preform.

According to another feature, the holes are made at the ends of the slits away from an edge of the preform.

According to another feature, the manufacturing method comprises a step of cutting and shaping a bottom preform, so that a dish shape is obtained, together with a step of assembling the bottom preform with the cylindrical or truncated conical shape of the chamber so that a chamber with a bottom wall is obtained.

According to another feature, the preform comprises first and second side edges that each have several unaligned segments, configured to obtain, after the step of shaping and assembly, a side wall including several superposed truncated conical shapes.

The invention also relates to an acoustic element of a sound absorption structure obtained using the manufacturing method according to one of the previous features.

According to another feature, the acoustic element of a sound absorption structure comprises a first chamber having at least one first side wall, that extends between first and second edges, obtained from a first preform cut flat, shaped and assembled, together with a second chamber having at least one second side wall, that extends between first and second edges, obtained from a second preform cut, shaped and assembled, the first and second chambers being connected at the first edges of the first and second side walls.

According to one embodiment, the second chamber comprises a second bottom wall formed by tabs of the second preform folded and connected to each other in a joining zone.

According to one configuration, the tabs are delimited by slits and folded along folding lines, the slits having holes positioned on the folding lines of the tabs.

According to another embodiment, the second chamber comprises a dish shape that has a bottom together with a curved peripheral edge connected to the second edge of the second side wall.

According to one configuration, the curved peripheral edge comprises several tabs delimited by slits and folded along folding lines, the slits having holes positioned on the folding lines of the tabs.

According to one embodiment, the first and second chambers are connected by a continuous or discontinuous contact joining zone on the perimeter of the first and second chambers, that adjoins the first edges, that extends over the entire periphery of the first edges and over a given height.

According to another embodiment, the first chamber comprises a plurality of tabs, on the first edge of the first side wall, folded around the first edge of the second side wall to obtain a connection between the first and second chambers.

According to another feature, the first side wall comprises slits that extend from its first edge.

According to one configuration, the slits have a length greater than the given height of the contact joining zone.

According to another feature, the acoustic element comprises a third chamber, positioned between the first and second chambers, that comprises a side wall delimited by a first edge, connected to at least one of the first and second chambers, as well as by a second edge, opposite the first edge, that defines an edge of an acoustic orifice.

The invention also relates to a sound absorption structure comprising at least one acoustic element according to one of the previous features, together with an aircraft powerplant comprising at least one such sound absorption structure.

BRIEF DESCRIPTION OF THE DRAWINGS

Further features and advantages will become apparent on reading the following description of the invention, given by way of example only, with reference to the attached drawings, in which:

FIG. 4 is a diagrammatic representation showing the different steps of a method for manufacturing an acoustic element of a sound absorption structure that illustrates a first embodiment of the invention, FIG. 5 is a perspective cross-section of an upper part of an acoustic element obtained according to the first embodiment visible in FIG. 4, FIG. 6 is a perspective cross-section of a lower part of an acoustic element obtained according to the first embodiment visible in FIG. 4, FIG. 22 is an exploded perspective view of the different elements of a sound absorption structure that illustrates another embodiment of the invention, FIG. 23 is a perspective view of part of a sound absorption structure obtained from the elements visible in FIG. 22, FIG. 24 is a transverse cross-section of the sound absorption structure visible in FIG. 23.

DETAILED DESCRIPTION

Figure 1:
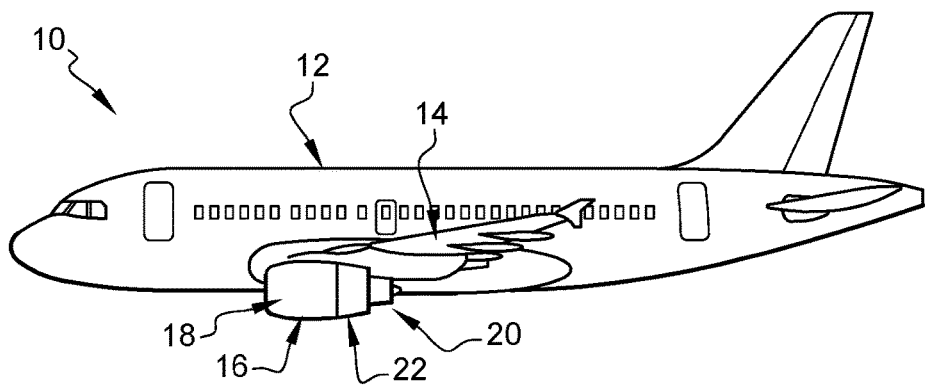
FIG. 1 is a side view of an aircraft.

FIG. 1 shows an aircraft 10 that has a fuselage 12, two wings 14, arranged on either side of the fuselage 12, and powerplants 16 attached underneath the wings 14. Each powerplant 16 comprises a nacelle 18 and a turbine engine 20 positioned inside the nacelle 18. The powerplant 16 comprises a thrust reverser device 22 at the rear.

Figure 2:
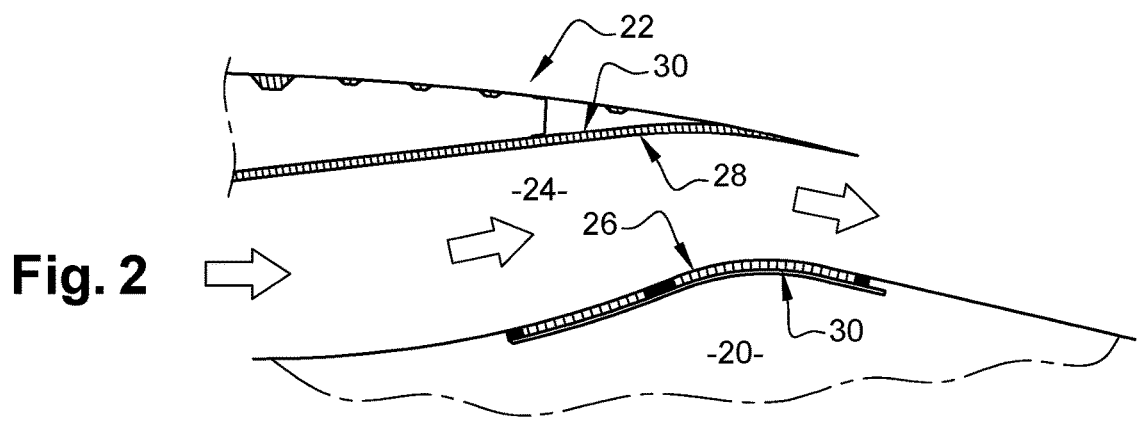
FIG. 2 is a longitudinal cross-section of a thrust reverser device of an aircraft powerplant comprising at least one sound absorption structure that illustrates an application of the invention.

According to an embodiment visible in FIG. 2, the powerplant 16 comprises a secondary discharge duct 24, channelling a secondary air flow, that is defined, on the thrust reverser device 22, by an inner wall 26 (also known as an IFS or inner fixed structure) and by an outer wall 28 (also known as an OFS or outer fixed structure).

According to one configuration, the inner wall 26 or the outer wall 28 comprises a sound absorption structure 30 (also known as an acoustic panel) positioned on a skin 32 that defines the secondary duct 24 and that has an outer surface OS, in contact with the secondary air flow, and an inner surface IS, opposite the outer surface OS.

Although it is described as applied to a secondary discharge duct 24, the invention is not limited to this application. The sound absorption structure 30 can thus be positioned on any skin 32 that has an outer surface OS in contact with a medium in which sound waves propagate during operation and an inner surface IS opposite the outer surface OS, such as for example a lip and an air intake duct of an aircraft nacelle, a fan casing of an aircraft nacelle or any other surface of the powerplant 16. Regardless of the configuration, the powerplant 16 comprises at least one sound absorption structure 30.

Figure 3:
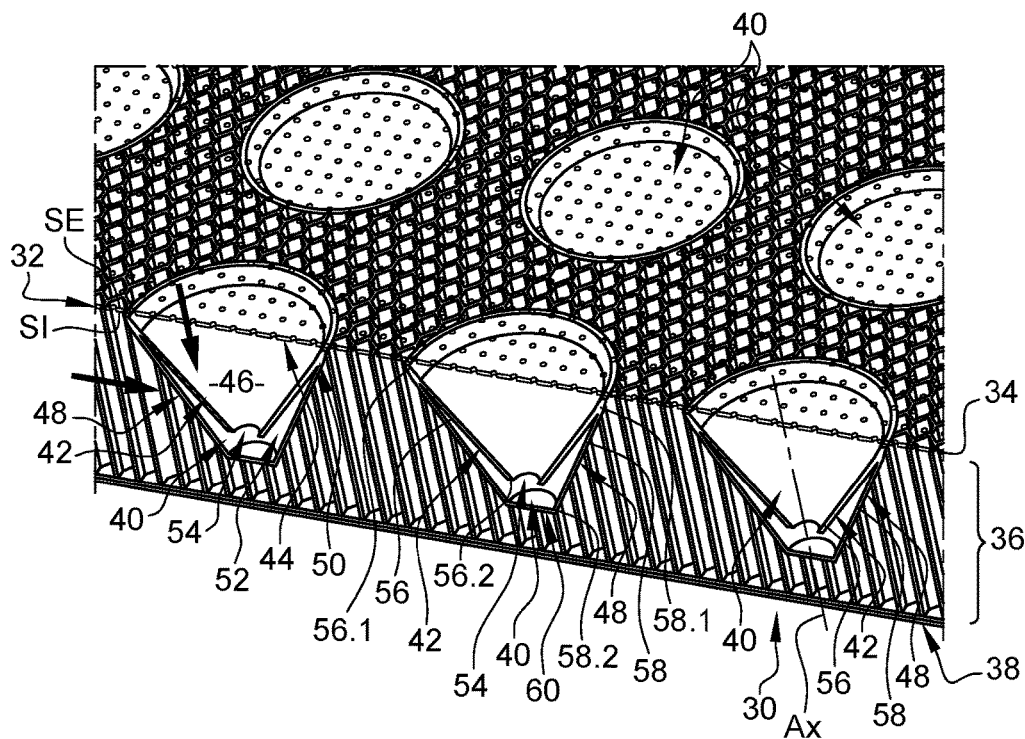
FIG. 3 is a perspective cross-section of a sound absorption structure that illustrates a mode of incorporation of the invention into an acoustic panel.

According to an embodiment visible in FIG. 3, the sound absorption structure 30 comprises, from the outer surface OS towards the inner surface IS, a porous layer 34 one face of which forms the outer surface OS, at least one cellular layer 36, a reflective layer 38 and a plurality of acoustic elements 40, positioned in the cellular layer 36, that each have at least one cavity shut off by the porous layer 34. According to one configuration, the cellular layer 36 is a honeycomb structure that has recesses for accommodating the acoustic elements 40.

According to another embodiment, the sound absorption structure 30 comprises a skin 32, a first face of which forms the outer surface OS and a second face of which forms the inner surface IS, together with a plurality of acoustic elements 40, positioned against the inner surface IS of the skin 32, that each have at least one cavity shut off by the skin 32, the latter being at least porous over each acoustic element 40.

Regardless of the embodiment, the sound absorption structure 30 comprises at least one acoustic element 40.

According to an embodiment visible in FIG. 3, an acoustic element 40 comprises:
 a first chamber 42, also known as a cone, that has a first mouth 44 delimited by an edge pressed against the inner surface IS of the skin 32 so that the first chamber 42 and the skin 32 define a first cavity 46,
 a second chamber 48, also known as a capsule, in which the first chamber 42 is positioned, at least partially separated from the first chamber 42, that has a second mouth 50 delimited by an edge pressed against the first chamber 42 (or optionally the inner surface IS of the skin 32) so that the second chamber 48 and the first chamber 42 (and optionally the skin 32) define a second cavity 52,
 at least one acoustic orifice 54 passing through the first chamber 42 to connect the first and second cavities 46, 52.

According to another embodiment visible in FIGS. 22 to 24, an acoustic element 40 comprises a first chamber 42 that has a first mouth 44, pressed against the skin forming the porous layer 34 so that the first chamber 42 and the porous layer 34 define a first cavity 46, together with at least one acoustic orifice 54 passing through the first chamber 42 to connect the first cavity 46 to at least one cavity of a cell of the cellular layer 36. According to this embodiment, the acoustic element 40 comprises a single chamber 42.

According to an arrangement visible in FIGS. 3 and 23, the acoustic elements 40 are arranged in several rows and several columns. Other arrangements could be envisaged.

According to an embodiment visible in FIGS. 3 and 4, for example, the first chamber 42 is a truncated conical shape and comprises a first side wall 56, delimited by a first edge 56.1, oriented towards the skin 32 and forming the first mouth 44, as well as by a second edge 56.2, opposite the first edge 56.1, that defines the edge of the acoustic orifice 54.

According to another configuration not shown, the first chamber 42 is a truncated conical shape and comprises, in addition to the truncated conical first side wall 56, a first bottom wall positioned on the second edge 56.2 of the first side wall 56 so that it closes the first cavity 46. According to this configuration, the acoustic orifice(s) 54 is (or are) positioned on the first side wall 56 and/or on the first bottom wall.

According to another embodiment not shown, the first chamber 42 is conical and comprises a conical first side wall delimited by a first edge, oriented towards the skin 32 and forming the first mouth, as well as by a closed vertex.

According to another embodiment visible in FIGS. 22 to 24, the first chamber 42 is tubular and comprises a cylindrical first side wall 56', delimited by a first edge 56.1', oriented towards the skin 32 and forming the first mouth 44, as well as by a second edge 56.2'. In addition to the cylindrical first side wall 56', the first chamber 42 can comprise a first bottom wall 57'. The acoustic orifice(s) 54 is (or are) positioned on the first side wall 56' and/or on the first bottom wall 57'.

According to an embodiment visible in FIGS. 3 and 4, for example, the second chamber 48 is a truncated conical shape and comprises a second side wall 58, delimited by a first edge 58.1, oriented towards the skin 32 and forming the second mouth 50, and by a second edge 58.2 opposite the first edge 58.1, as well as a second bottom wall 60 positioned on the second edge 58.2 of the second side wall 58 so that it closes the second cavity 52.

According to another configuration not shown, the second chamber 48 is conical and comprises a conical first side wall delimited by a first edge, oriented towards the skin 32 and forming the first mouth, as well as by a closed vertex.

According to another embodiment, the second chamber 48 is tubular and comprises a cylindrical second side wall, delimited by a first edge, oriented towards the skin and forming the second mouth, and by a second edge as well as a second bottom wall to close the second cavity 52. According to another embodiment visible in FIGS. 25 and 26, the second chamber 48 is tubular and comprises a cylindrical second side wall delimited by a first edge oriented towards the skin and forming the second mouth, and by a second edge. According to this embodiment, the second chamber 48 does not comprise a bottom. It can be obtained from a rectangular preform 148 rolled so that it forms a tube.

According to a configuration visible in FIG. 3, the first chamber 42 is approximately centred in the second chamber 48 so that the first and second walls 56, 58 are coaxial and have a single axis of rotation Ax.

Of course, the invention is not limited to the arrangements visible in FIGS. 3 and 23 of the acoustic elements 40 and/or to these geometries and configurations of the first and second chambers 42 and 48.

According to an embodiment visible in FIG. 4, the acoustic element 40 comprises first and second chambers 42, 48, the first chamber 42 including a first side wall 56 obtained from a shaped flat first preform 62, a second chamber 48 including a second side wall 58 obtained from a shaped flat second preform 64 together with a second bottom wall 60 obtained from a shaped flat third preform, known as the bottom preform, 66.

The first preform 62 is cut out of a plate or sheet and has straight first and second side edges 68.1, 68.2, forming an angle α1, a convex first curved edge 70.1, connecting the most distant ends of the first and second side edges 68.1, 68.2, and a concave second curved edge 70.2 connecting the closest ends of the first and second side edges 68.1, 68.2.

Hereinafter, a plate or sheet is an element that is flat and thin relative to the other dimensions.

Next, the first preform 62 is shaped, by rolling for example, so that the first and second side edges 68.1, 68.2 are connected, in a joining zone 72, to obtain the truncated conical shape of the first side wall 56 of the first chamber 42. According to one configuration, the first and second side edges 68.1, 68.2 are overlapping, over their entire length, in the joining zone 72 that has a width l1 of between 2 and 10 mm depending on the geometry of the first preform 62. The join between the first and second side edges 68.1, 68.2 is produced by bonding, welding, soldering or any other assembly method.

The angle α1 of the first preform is determined depending on the solid angle required for the first side wall 52, and the joining zone 72. The radii of curvature of the first and second curved edges 70.1, 70.2 are determined so that, after the joining of the first and second side edges 68.1, 68.2, the convex first curved edge 70.1 is arranged in a plane and forms the first edge 56.1 of the first side wall 56 and the concave second curved edge 70.2 is arranged in a plane and forms the second edge 56.2 of the first side wall 56.

The second wall 58 is obtained in approximately the same way, from a second preform 64 cut out of a plate or sheet. The second preform 64 has first and second side edges 72.1, 72.2, forming an angle α2, a convex first curved edge 74.1, connecting the most distant ends of the first and second side edges 72.1, 72.2, and a concave second curved edge 74.2 connecting the closest ends of the first and second side edges 72.1, 72.2. Next, the second preform 64 is shaped and the first and second side edges 72.1, 72.2 are connected, as for the first preform 62.

The bottom preform 66 is cut out of a plate or sheet so that a disc with radius R is obtained. Next, the bottom preform 66 is shaped (for example by thermoforming) so that a dish shape 75 is obtained that has a flat or domed bottom 76, corresponding to the second bottom wall 60, and a curved peripheral edge 78, configured to engage with the second edge 58.2 of the second side wall 58.

Then, the first, second and third preforms 62, 64, 66 are assembled in order to obtain the acoustic element 40. Thus, the shaped first preform 62 forming the first side wall 56 is inserted into the shaped second preform 64 forming or thermoforming the second side wall 58 so that the first edges 56.1, 58.1 of the first and second side walls 56, 58 are coplanar. Next, the first and second side walls 56, 58 are connected in a contact joining zone 80 (visible in FIG. 5) that adjoins the first edges 56.1, 58.1, that extends over the entire periphery of the first edges 56.1, 58.1 and over a height l2 of between 2 and 10 mm. The contact joining zone 80 between the first and second side walls 56, 58 of the first and second chambers 42, 48 is produced by bonding, welding, soldering or any other assembly method. The contact joining zone 80 can be continuous or discontinuous (over the circumference of the first and second chambers 42, 48) depending on the manufacturing method used.

The dish shape 75 formed from the third preform 66 is positioned so that its curved peripheral edge 78 covers the second edge 58.2 of the second side wall 58. Next, the second and third preforms 64, 66 are connected in a joining zone 82 (visible in FIG. 6) that extends over the entire periphery of the second edge 58.2 of the second side wall 58 and over a height l3 of between 2 and 10 mm, as illustrated in FIG. 6. The join between the second and third preforms 64, 66 is produced by bonding, welding, soldering or any other assembly method.

According to a second embodiment visible in FIGS. 7 to 10, the second chamber 48 is obtained from a flat single preform 64' shaped in order to obtain the second side wall 58 and the second bottom wall 60.

The second preform 64' is cut out of a plate or sheet and has first and second side edges 72.1', 72.2', forming an angle α2, a convex first curved edge 74.1', connecting the most distant ends of the first and second side edges 72.1', 72.2', and a concave second curved edge 74.2' connecting the closest ends of the first and second side edges 72.1', 72.2'.

Figures 8, 9, 10:
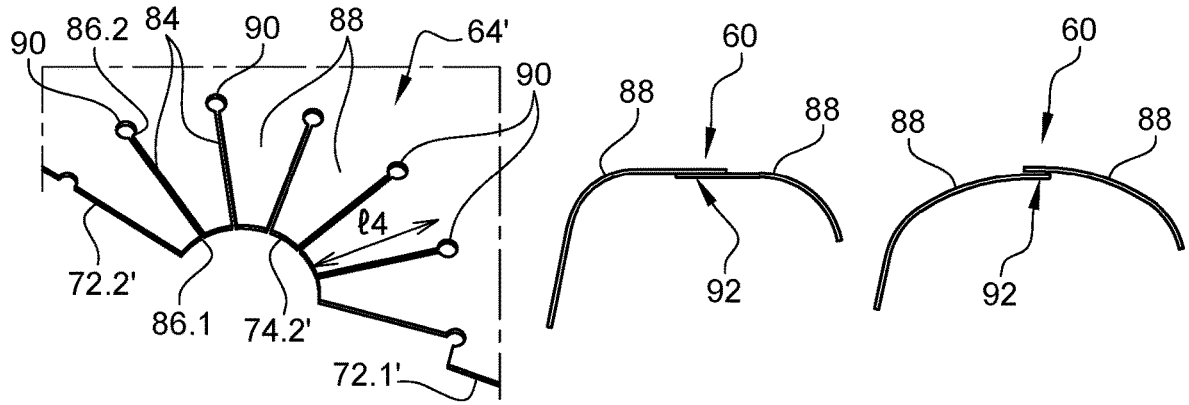
FIG. 8 is a perspective view of a part of a preform used for the implementation of the second embodiment visible in FIG. 7.
FIG. 9 is a diagrammatic cross-section of a lower part of the acoustic element visible in FIG. 7 that illustrates a first variant of the invention.
FIG. 10 is a diagrammatic cross-section of a lower part of the acoustic element visible in FIG. 7 that illustrates a second variant of the invention.

According to this second embodiment, as illustrated in detail in FIG. 8, the second preform 64' comprises a plurality of slits 84 that each extend from a first end 86.1, positioned on the concave second curved edge 74.2', to a second end 86.2. The slits 84 are evenly distributed over the entire length of the second curved edge 74.2'. Each slit 84 extends in a direction perpendicular to the tangent to the second curved edge 74.2' at its first end 86.1. The slits 84 have a length l4 (distance between the first and second ends 86.1, 86.2) of between half of the radius and the radius of the second edge 58.2 of the second wall 58 and the radius. These slits 84 define tabs 88 between them. By way of example, the second preform 64' comprises 4, 6 or 8 tabs 88.

According to one configuration, each slit 84 comprises a hole 90 at its second end 86.2. The holes 90 have a diameter greater than the width of the slits 84. These holes 90 can be circular or otherwise and have a diameter of between 0.2 and 3 mm. The holes 90 make it possible to limit the appearance of any cracks, impart a certain flexibility for deforming the tabs 88 and can allow a flow of fluid through the second chamber 48 in order to obtain a drainage function represented by arrows in FIG. 7.

As previously, the second preform 64' is shaped and the first and second side edges 72.1', 72.2' are connected in order to obtain the second side wall 58. Next, the tabs 88 are folded along a folding line and connected to each other, in a joining zone 92, so that they form the second bottom wall 60. According to a first variant visible in FIG. 9, the tabs 88 are folded so that they form an approximately flat second bottom wall 60. According to a second variant visible in FIG. 10, the tabs 88 are folded so that they form a domed second bottom wall 60. After the tabs 88 have been folded, the holes 90 are positioned on the folding lines of the tabs 88.

Figure 11:
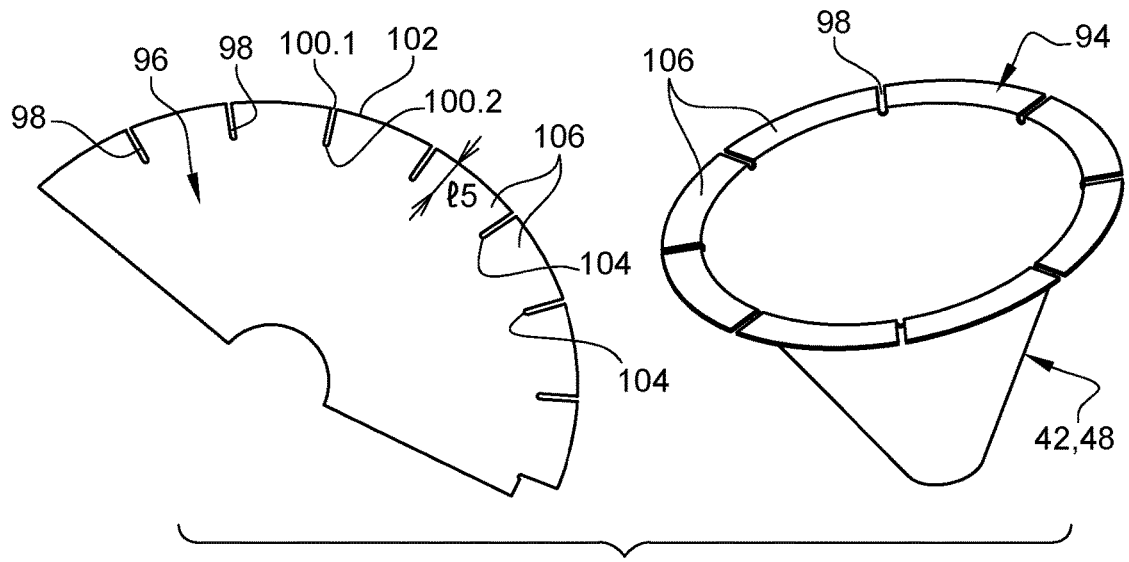
FIG. 11 is a diagrammatic representation showing the different steps of a method for manufacturing a chamber of an acoustic element of a sound absorption structure that illustrates a third embodiment of the invention.

According to a third embodiment visible in FIG. 11, the first and/or second chamber 42, 48 comprises a collar 94. When the first chamber 42 is provided with the collar 94, the latter is configured to be pressed against the inner surface IS of the skin 32 and to provide the connection between the first chamber 42 and the skin 32. When the second chamber 48 is provided with the collar 94, the latter is configured to be pressed against the inner surface IS of the skin 32 or a collar of the first chamber 42 and to provide the connection between the second chamber 48 and the skin 32 or the first chamber 42.

According to the third embodiment and as previously, the first and/or second chamber 42, 48 is obtained from a preform 96 cut out of a plate or sheet substantially similar to the first preform 64. This preform 96 comprises a plurality of slits 98 that each extend from a first end 100.1, positioned on a convex first curved edge 102 of the preform 96, to a second end 100.2. The slits 98 are evenly distributed over the entire length of the convex first curved edge 102. Each slit 98 extends in a direction perpendicular to the tangent to the convex first curved edge 102 at its first end 100.1. The slits have a length l5 depending on the width of the collar 94. Each slit 98 can comprise a hole 104, at its second end 100.2, that has a diameter greater than the width of the slit 98. These holes 104 can be circular or otherwise and have a diameter of between 0.2 and 3 mm. These slits 98 define tabs 106 between them.

As illustrated in FIG. 11, the preform 96 is deformed and assembled so that a conical or truncated conical shape is obtained. Next, the tabs 106 are folded so that they form the collar 94.

Figure 12:
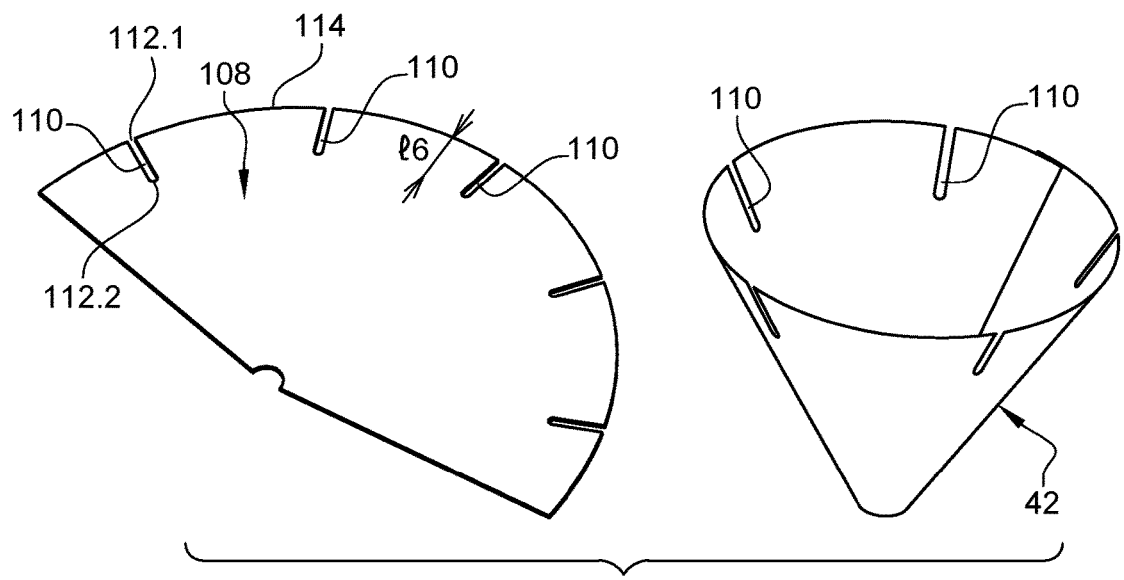
FIG. 12 is a diagrammatic representation showing the different steps of a method for manufacturing a chamber of an acoustic element of a sound absorption structure that illustrates a fourth embodiment of the invention.
Figure 25:
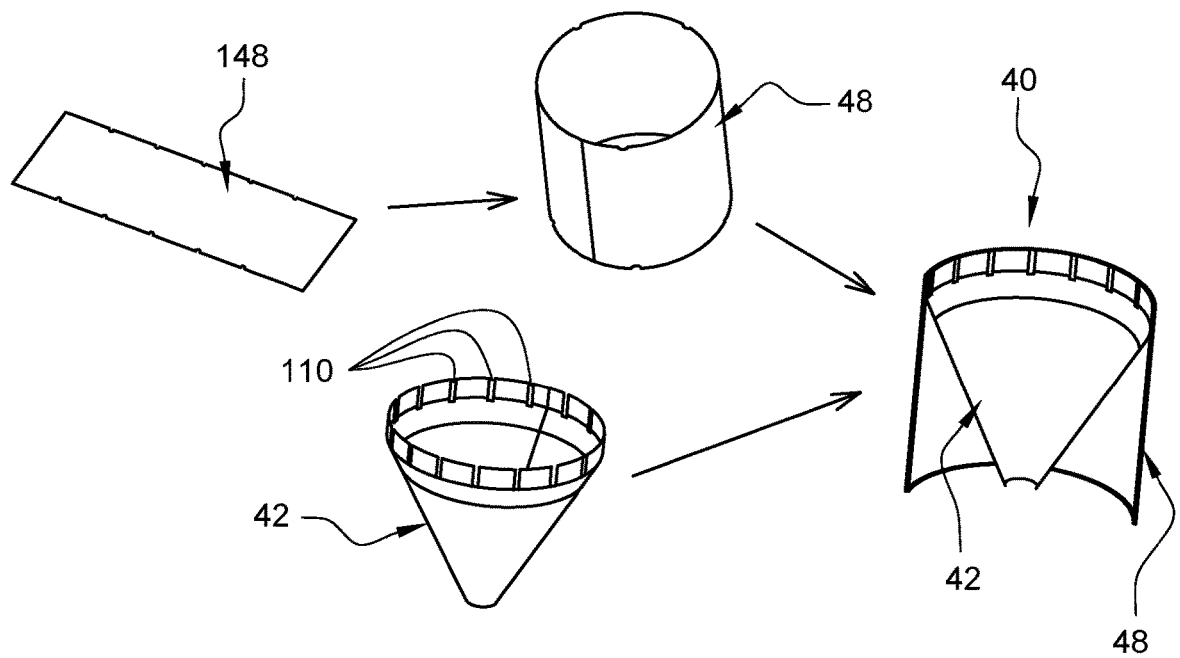
FIG. 25 is a diagrammatic representation showing the different steps of a method for manufacturing an acoustic element of a sound absorption structure that illustrates another embodiment of the invention.
Figure 26:
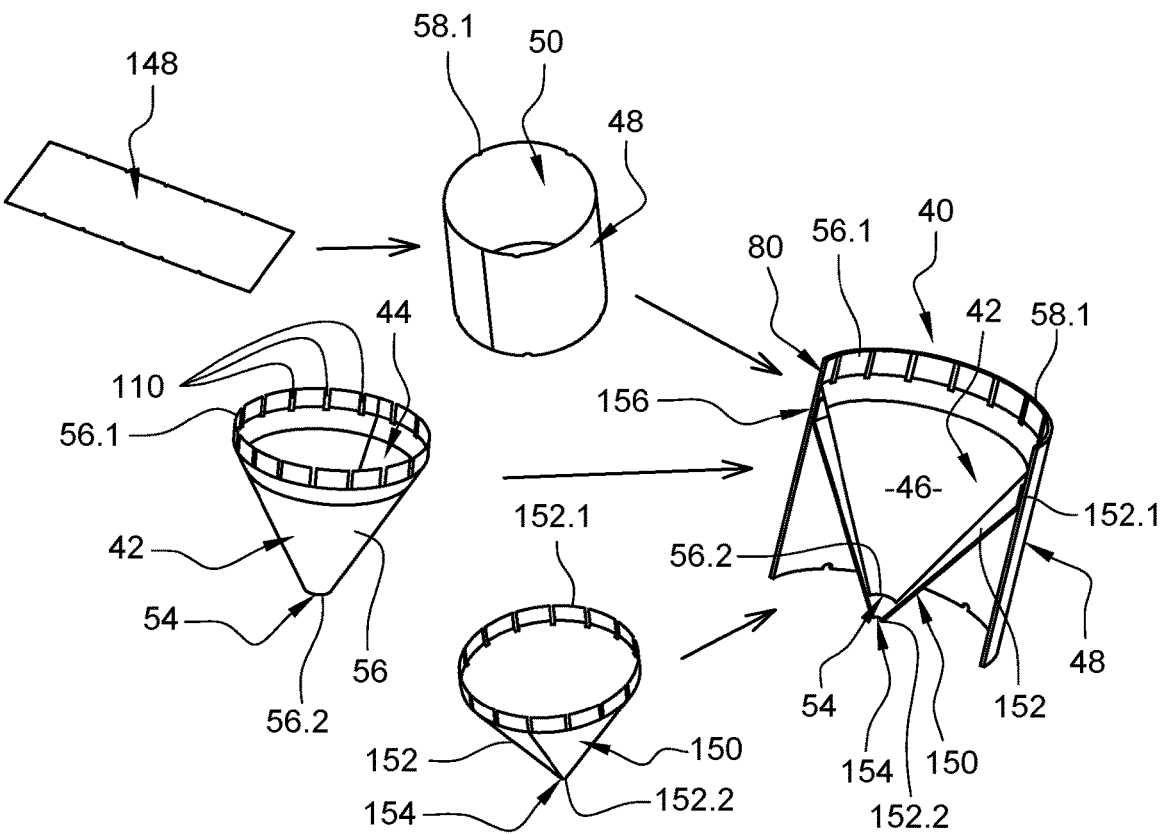
FIG. 26 is a diagrammatic representation showing the different steps of a method for manufacturing an acoustic element of a sound absorption structure that illustrates another embodiment of the invention.

According to a fourth embodiment visible in FIGS. 12, 25 and 26, the first chamber 42 is obtained from a preform 108 that has an outline substantially identical to the outline of the preform 64 of the first embodiment. This preform 108 comprises a plurality of slits 110 that each extend from a first end 112.1, positioned on a convex first curved edge 114 of the preform 108 (which corresponds to the first edge 58.1 of the first side wall 58), to a second end 112.2. The slits 110 are evenly distributed over the entire length of the convex first curved edge 114. Each slit 110 extends in a direction perpendicular to the tangent to the convex first curved edge 114 at its first end 112.1. These slits 110 have a length l6 equal to or slightly greater than the joining zone 80 between the first and second chambers 42 and 48. These slits 110 can have holes, as in the second embodiment. The slits 110 impart a certain flexibility to the upper part of the first chamber 42 that makes it possible to absorb any deformations when the first and second chambers 42, 48 are joined together. These slits 110 can also make it possible to widen the taper of the upper part of the first chamber 42.

Figure 13:
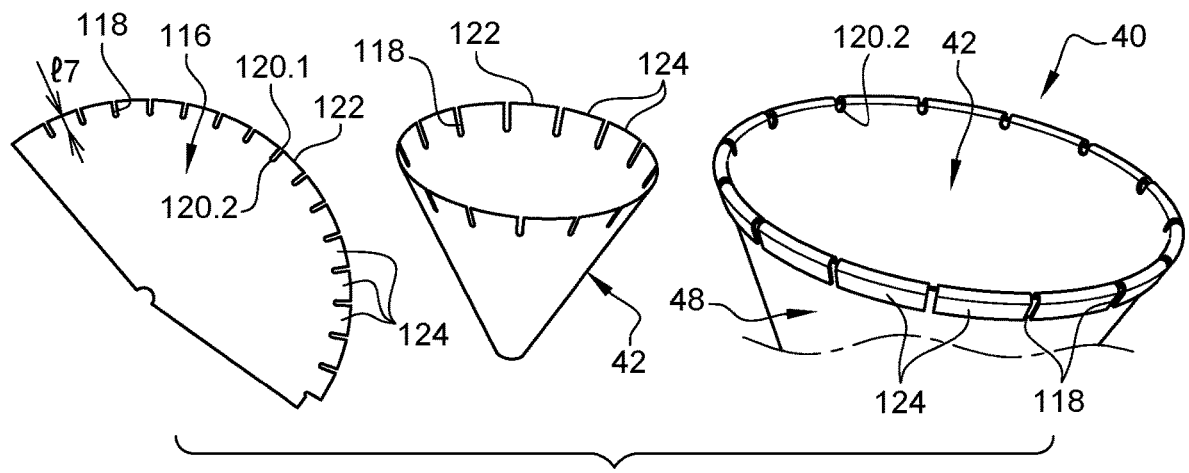
FIG. 13 is a diagrammatic representation showing the different steps of a method for manufacturing a chamber of an acoustic element of a sound absorption structure that illustrates a fifth embodiment of the invention.
Figures 14, 15:
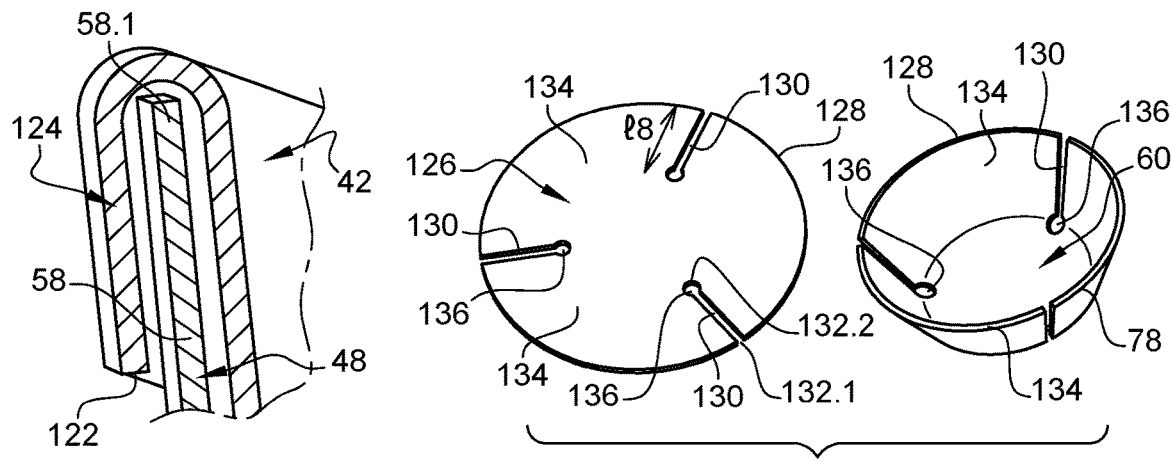
FIG. 14 is a cross-section of an upper part of an acoustic element comprising a chamber produced according to the fifth embodiment visible in FIG. 13.
FIG. 15 is a diagrammatic representation showing the different steps of a method for manufacturing a lower part of a chamber of an acoustic element of a sound absorption structure that illustrates an embodiment of the invention.

According to a fifth embodiment visible in FIGS. 13 and 14, the first chamber 42 is obtained from a preform 116 that comprises slits 118 that each extend from a first end 120.1, positioned on a convex first curved edge 112 of the preform 116, to a second end 120.2. The slits 118 are evenly distributed over the entire length of the convex first curved edge 122. Each slit 118 extends in a direction perpendicular to the tangent to the convex first curved edge 122 at its first end 120.1 and has a length l7. The slits 118 can have holes, as for the second embodiment. The slits 118 define tabs 124 between them that are used to obtain a connection, by clamping or crimping, between the first and second chambers 42, 48.

According to this fifth embodiment, the first chamber 42 is inserted inside the second chamber 48 until the second ends 120.2 of the slits 118 are positioned approximately level with the first edge 58.1 of the second side wall 58 forming the second chamber 48. Next, the tabs 124 are folded around the first edge 58.1 of the second side wall 58 so that they are pressed against the outer face of the second side wall 58, as illustrated in FIG. 14.

According to an embodiment illustrated by FIG. 15, the second bottom wall 60 is obtained from a third bottom preform 126 that has a circular peripheral edge 128 and radial slits 130 that each extend in a radial direction, between a first end 132.1 situated on the peripheral edge 128 and a second end 132.2. These slits 130 have a length l8 that corresponds to the height of the curved peripheral edge 78 of the dish shape 75. They define tabs 134 between them.

According to one configuration, each slit 130 comprises a hole 136, at its second end 132.2, that has a diameter greater the width of the slit 130. These holes 136 can be circular or otherwise and have a diameter of between 0.2 and 3 mm. The holes 136 make it possible to limit the appearance of any cracks, impart a certain flexibility for deforming the tabs 134 and can allow a flow of fluid through the second chamber 48 in order to obtain a drainage function represented by arrows in FIG. 17.

Once it has been cut out of a plate or sheet, the third bottom preform 126 is shaped by curving the tabs 134 along folding lines so that the dish shape 75 is obtained. After shaping, the holes 136 are positioned on the folding lines of the tabs 134.

Figure 16:
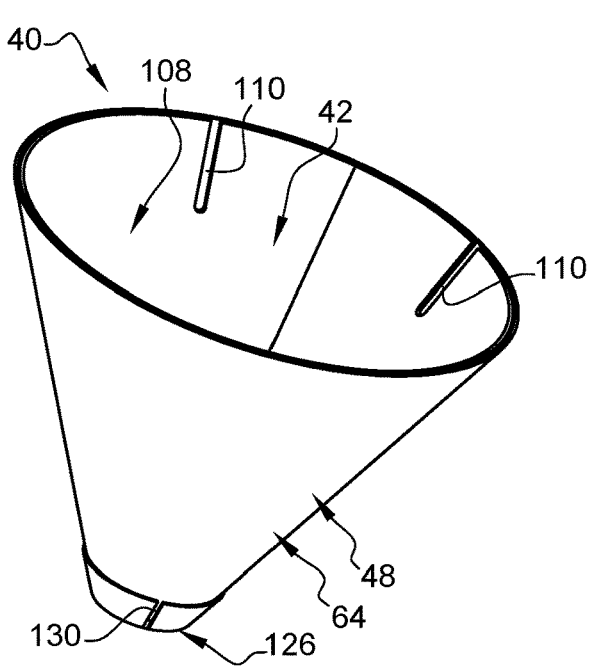
FIG. 16 is a perspective view of an acoustic element that illustrates another embodiment of the invention.
Figure 17:
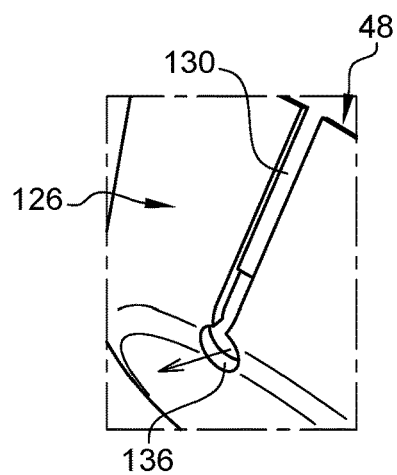
FIG. 17 is a perspective view of a lower part of the acoustic element visible in FIG. 16.
Figure 18:
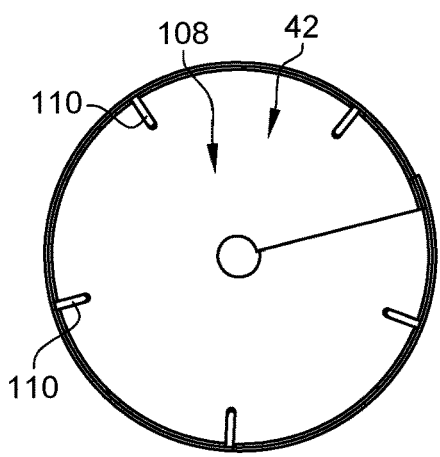
FIG. 18 is a top view of the acoustic element visible in FIG. 16.

According to an embodiment illustrated by FIGS. 16, 17 and 18, an acoustic element 40 comprises:
  a first chamber 42 obtained and assembled with a second chamber 48, according to a fourth embodiment visible in FIG. 12, from a first preform 108,
  a second chamber 48 obtained from a second preform 64, cut out and shaped according to the first embodiment visible in FIG. 4, and a third bottom preform 126 cut out and shaped according to the embodiment visible in FIG. 15, the second and third preforms 64 and 126 being assembled according to the first embodiment visible in FIG. 4.

According to this embodiment, the acoustic element 40 comprises slits 110 on the first side wall 56, that extend from the first edge 56.1 of the first side wall 56, to facilitate the assembly of the first and second chambers 42 and 48, slits 130 to facilitate the shaping of the third preform 126 and holes 136 to obtain a draining function.

Figure 19:
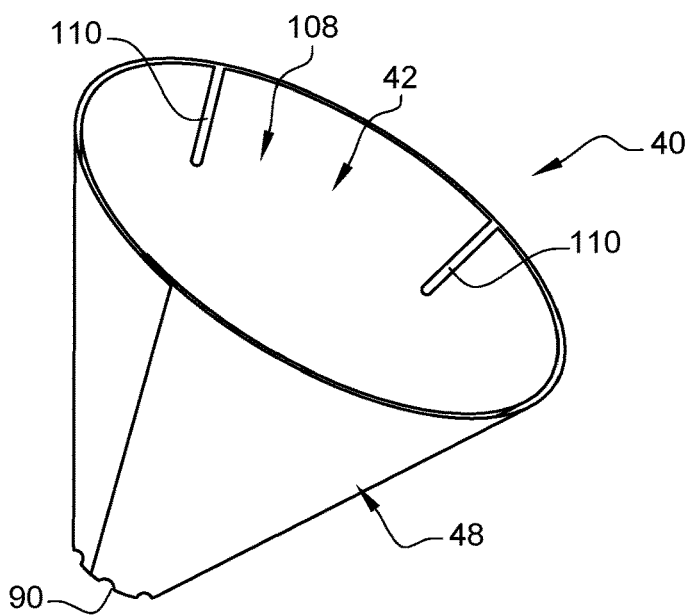
FIG. 19 is a perspective view of an acoustic element that illustrates another embodiment of the invention.

According to another embodiment illustrated by FIG. 19, an acoustic element 40 comprises:
  a first chamber 42 obtained and assembled with a second chamber 48, according to a fourth embodiment visible in FIG. 12, from a first preform 108, and
  a second chamber 48 obtained according to the second embodiment visible in FIGS. 7 to 10, from a second preform 64'.

According to this embodiment, the acoustic element 40 comprises slits 110 to facilitate the assembly of the first and second chambers 42 and 48, and holes 90 to obtain a draining function.

Figure 20:
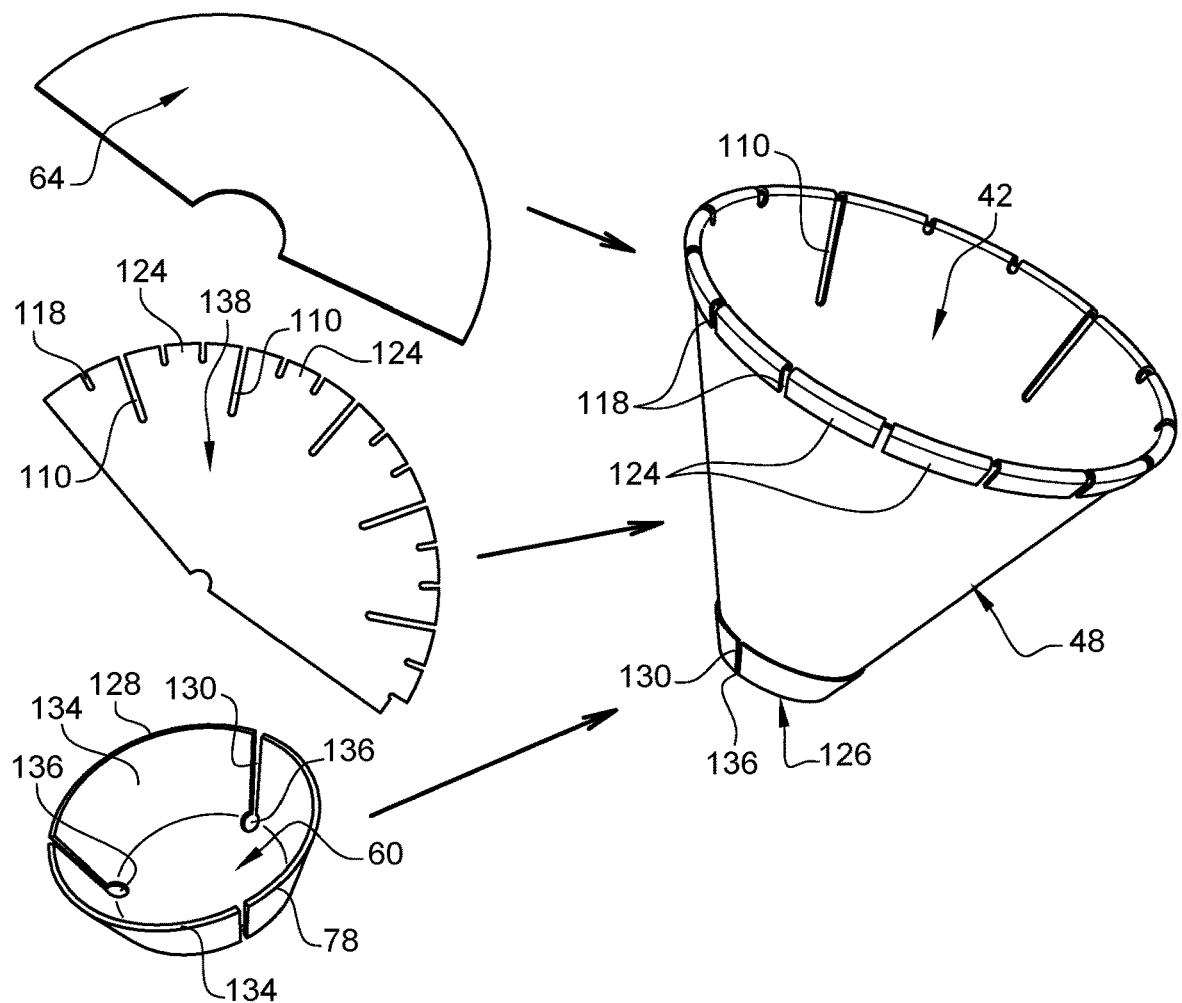
FIG. 20 is a diagrammatic representation showing the different steps of a method for manufacturing an acoustic element of a sound absorption structure that illustrates another embodiment of the invention.

According to another embodiment visible in FIG. 20, an acoustic element 40 comprises:
  a first chamber 42 obtained and assembled with a second chamber 48, according to the fourth and fifth embodiments visible in FIGS. 12 and 13, from a first preform 138 that has a first series of first slits 110 making it possible to widen the taper of the upper part of the first chamber 42 and a second series of second slits 118 defining, between them and with the first slits 10, tabs 124 used to obtain a connection between the first and second chambers 42, 48, the first slits 110 being longer than the second slits 118,
  a second chamber 48 obtained from a second preform 64, cut out and shaped according to the first embodiment visible in FIG. 4, and a third preform 126 cut out and shaped according to the embodiment visible in FIG. 15, the second and third preforms 64 and 126 being assembled according to the first embodiment visible in FIG. 4.

According to this embodiment, the acoustic element 40 comprises slits 110 on the first side wall 56, that extend from the first edge 56.1 of the first side wall 56, to widen the taper of the first chamber, a plurality of tabs 124 on the first edge 56.1 of the first side wall 56, folded around the first edge 58.1 of the second side wall 58 to obtain a connection between the first and second chambers 42, 48, slits 130 to facilitate the shaping of the third preform 126 and finally holes 136 to obtain a draining function.

According to another embodiment visible in FIG. 26, the acoustic element 40 comprises:

a truncated conical first chamber 42 that has an acoustic orifice 54 at a first end together with a first mouth 44 at a second end, delimited by an edge 56.1 pressed against the inner surface IS of the skin 32 so that the first chamber 42 and the skin 32 define a first cavity 46.

a cylindrical second chamber 48, in which the first chamber 42 is positioned, at least partially separated from the first chamber 42, that has a second mouth 50 delimited by an edge 58.1 pressed against the first chamber 42 (or optionally the inner surface IS of the skin 32).

According to one embodiment, the first chamber 42 comprises a first side wall 56, delimited by a first edge 56.1, oriented towards the skin 32 and forming the first mouth 44, as well as by a second edge 56.2, opposite the first edge 56.1, that defines the edge of the acoustic orifice 54. According to one configuration, the first chamber 42 is obtained from a preform 108 illustrated in FIG. 12.

According to one embodiment, the second chamber 48 is obtained from a rectangular preform 148 as illustrated in FIG. 25.

The first and second chambers 42, 48 are connected in a first joining zone 80, that adjoins the edges 56.1, 58.1, obtained by bonding, welding, soldering or any other assembly method.

According to the embodiment visible in FIG. 26, the acoustic element 40 comprises a third chamber 150, positioned between the first and second chambers 42, 48, that comprises a side wall 152 delimited by a first edge 152.1, oriented towards the skin 32 and connected to at least one of the first and second chambers 42, 48, as well as by a second edge 152.2, opposite the first edge 152.1, that defines an edge of an acoustic orifice 154.

According to one configuration, the third chamber 150 is obtained from a preform similar to the preform 108 visible in FIG. 12 and its first edge 152.1 is connected to the second chamber 48 in a second joining zone 156 obtained by bonding, welding, soldering or any other assembly method. According to the configuration visible in FIG. 26, the second joining zone 156 is offset relative to the first joining zone 80. In a variant, the first and second joining zones 80, 156 could be superposed.

Of course, the invention is not limited to these embodiments of the acoustic element 40, which can be obtained by combining different embodiments of the first, second and third preforms.

Figure 21:
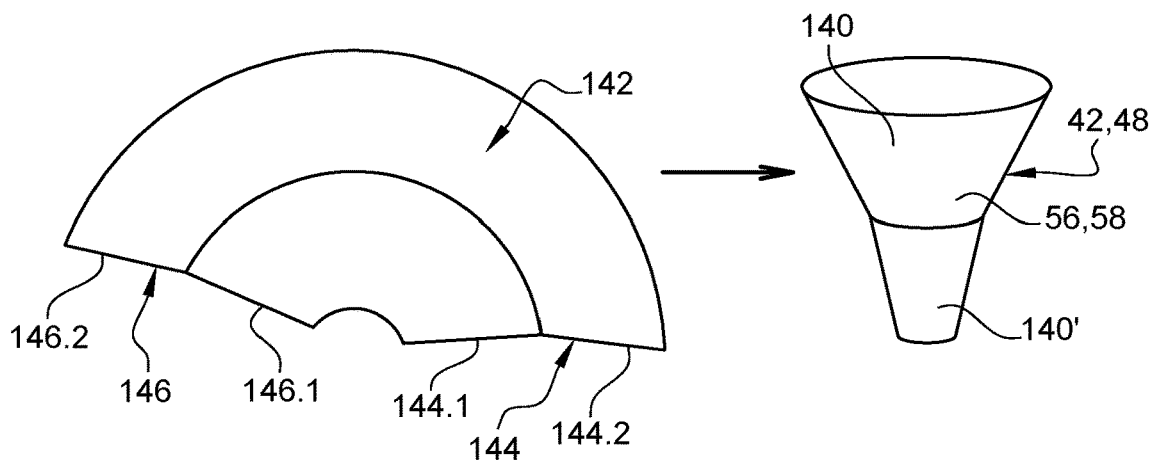
FIG. 21 is a diagrammatic representation showing the different steps of a method for manufacturing a chamber of an acoustic element that illustrates another embodiment of the invention.

In addition, at least one of the first and second side walls 56, 58 of the first and second chambers 42, 48 can comprise several superposed truncated conical shapes 140, 140', as illustrated in FIG. 21. According to one embodiment, the first or second chamber 42, 48 is obtained from a preform 142 that does not comprise straight side edges but first and second side edges 144, 146 that each have several unaligned segments 144.1, 144.2, 146.1, 146.2. For each truncated conical shape 140, 140', the preform 142 comprises a pair of segments formed by a first segment 144.1, 144.2 of the first side edge 144 and a second segment 146.1, 146.2 of the second side edge 146. For each pair, the first and second segments form an angle determined depending on the solid angle of the truncated conical shape 140, 140'.

The first and second side walls 56, 58 of the first and second chambers 42, 48 are not necessarily conical or truncated conical. According to an embodiment visible in FIGS. 22 to 24, the acoustic element 40 comprises a cylindrical side wall that is obtained from a rectangular flat preform, shaped into a cylinder, and optionally a bottom wall that is obtained from a shaped flat preform.

Regardless of the embodiment, the acoustic element 40 comprises at least one chamber 42, 48 that has at least one wall 56, 56', 58, 60 obtained from a shaped flat preform.

The different preforms are cut out of plates or sheets made from metal or a composite material. In the case of a composite material, the sheet has a thickness of between 0.3 and 0.8 mm The manufacturing method according to the invention makes it possible to use a composite material including long fibres embedded in a resin matrix, for example thermoplastic. Unlike short fibres, long fibres impart improved mechanical characteristics, particularly in terms of load bearing. The manufacturing method according to the invention also makes it possible to use metals with good mechanical characteristics at high temperatures such as those of a turbine engine jet nozzle, such as titanium or superalloys (marketed under the Inconel® brand, for example), which are difficult to shape using forming techniques.

Regardless of the material, the method for manufacturing a chamber 42, 48 comprises a step of cutting a preform out of a plate or sheet of material, a step of rolling the preform about an axis of rolling Ax, in order to obtain a cylindrical, conical or truncated conical shape, and a step of assembly so that two side edges of the preform are connected to retain the cylindrical, conical or truncated conical shape.

Depending on the materials, the cutting step can be carried out by laser or water jet cutting, stamping or any other cutting technique.

For the rolling step, the preform can be rolled on a mandrel in order to be shaped.

Depending on the materials, the assembly step can be carried out by welding (electric, ultrasonic, induction, etc.), bonding or any other assembly technique.

Thus, using the same manufacturing method, it is possible to obtain acoustic elements made from a composite material suitable for example for an air intake of a nacelle, acoustic elements made from an aluminium alloy suitable for example for an inner wall of the nacelle, and acoustic elements made from titanium or Inconel® suitable for example for a secondary discharge duct 24.

In a variant, a bottom wall can be obtained by moulding or from a flat preform shaped by die-stamping, thermoforming or any other shaping technique suitable for the material of the preform.

Figure 7:
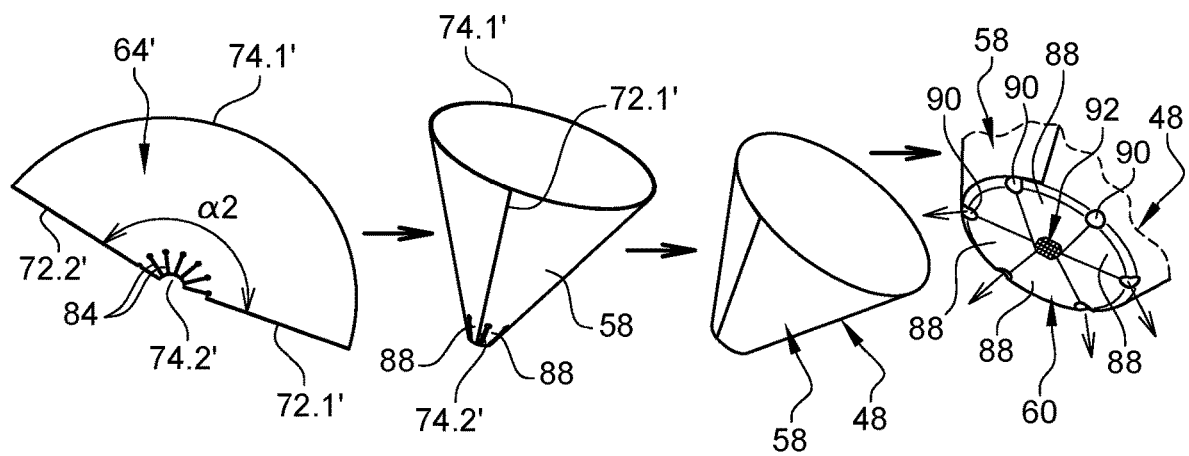
FIG. 7 is a diagrammatic representation showing the different steps of a method for manufacturing a chamber of an acoustic element of a sound absorption structure that illustrates a second embodiment of the invention.

The preform can comprise slits with a width of zero or at least 1 mm, to impart a certain flexibility to the preform in order to facilitate the shaping or assembly steps or to define tabs that are folded or curved so that they form a bottom wall (as illustrated in FIG. 7), a collar (as illustrated in FIG. 11), a connection between the first and second chambers 42, 48 (as illustrated in FIG. 13) or a curved peripheral edge 78 when the preform has a dish shape 75 (as illustrated in FIG. 15). When the preform is shaped, the slits are approximately positioned in planes containing the axis of rolling Ax and extend from a curved edge of the preform. When slits are present, the manufacturing method comprises a step of cutting the slits in the flat preform before the step of shaping said preform.

According to another feature, the preform comprises at least one through-hole, circular or otherwise, on a slit or otherwise, to perform a draining function or an acoustic function. If at least one hole is present, the manufacturing method comprises a step of obtaining at least one hole in the flat preform before the step of shaping said preform.

According to the invention, the method for manufacturing a chamber of an acoustic element of a sound absorption structure makes it possible to obtain acoustic elements having satisfactory mechanical characteristics, even in the case of a composite material, as well as thin walls making it possible to reduce the weight on board. According to another advantage, the manufacturing method can be used for different materials so that it is possible to manufacture acoustic elements suitable for different environments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing an acoustic element of a sound absorption structure comprising at least one chamber having a cylindrical, conical or truncated conical shape, wherein the method comprises:
   cutting at least one preform out of a plate or sheet of material;
   shaping the preform by rolling;
   assembling two side edges of the preform to obtain the cylindrical, conical or truncated conical shape of the chamber; and
   cutting at least one series of slits in the flat preform, before the shaping said preform.

2. The manufacturing method according to claim 1, wherein the slits are approximately positioned in planes containing the axis of rolling of the preform when said preform is shaped and extend from a curved edge of the preform.

3. The manufacturing method according to claim 1, wherein the slits extend from a concave curved edge of the preform and define first tabs and wherein the manufacturing method further comprises:
   folding the first tabs, after the shaping and assembling the preform; and
   joining the first tabs so that a bottom wall of the chamber is obtained.

4. The manufacturing method according to claim 1, wherein the preform comprises a first series of first slits extending from a convex curved edge of the preform.

5. The manufacturing method according to claim 1, wherein the preform comprises a second series of second slits extending from a convex curved edge of the preform so that the second series of second slits define second tabs and wherein the manufacturing method comprises:
   cutting, shaping and assembling the preform so that a first chamber is obtained;
   positioning the first chamber in a second chamber including a second side wall that has a first edge; and
   folding the second tabs, around the first edge of the second side wall, to press the second tabs against an outer face of the second wall of the second chamber to obtain an assembly of the first and second chambers.

6. The manufacturing method according to claim 1, further comprising obtaining at least one a hole in the flat preform, before the shaping said preform.

7. The manufacturing method according to claim 6, wherein the at least one hole is made at an end of one of the slits away from an edge of the preform.

8. The manufacturing method according to claim 1, further comprising cutting and shaping a bottom preform, so that a dish shape is obtained; and
   assembling the bottom preform with the cylindrical or truncated conical shape of the chamber so that a chamber with a bottom wall is obtained.

9. The manufacturing method according to claim 1, wherein the preform comprises first and second side edges that each have several unaligned segments, configured to obtain, after the shaping and assembly, a side wall including several superposed truncated conical shapes.

10. An acoustic element of a sound absorption structure obtained using the manufacturing method according to claim 1, the acoustic element comprising a first chamber having at least one first side wall, that extends between first and second edges, obtained from a first preform cut flat, shaped and assembled, together with a second chamber having at least one second side wall, that extends between first and second edges, obtained from a second preform cut, shaped and assembled, wherein the first and second chambers are connected at the first edges of the first and second side walls.

11. The acoustic element of a sound absorption structure according to claim 10, wherein the second chamber comprises a second bottom wall formed by tabs of the second preform folded and connected to each other in a joining zone.

12. The acoustic element of a sound absorption structure according to claim 11, wherein the tabs are delimited by the at least one series of slits and folded along folding lines, the at least one series of slits having holes positioned on the folding lines of the tabs.

13. The acoustic element of a sound absorption structure according to claim 10, wherein the second chamber comprises a dish shape having a bottom and a curved peripheral edge connected to the second edge of the second side wall.

14. The acoustic element of a sound absorption structure according to claim 13, wherein the curved peripheral edge comprises several tabs delimited by a second series of slits and folded along folding lines, the second series of slits having holes positioned on the folding lines of the tabs.

15. The acoustic element of a sound absorption structure according to claim 10, wherein the first and second chambers are connected by a continuous or discontinuous contact joining zone on the perimeter of the first and second chambers, that adjoins the first edges, that extends over the entire periphery of the first edges and over a given height.

16. The acoustic element of a sound absorption structure according to claim 10, wherein the first chamber comprises a plurality of tabs, on the first edge of the first side wall, folded around the first edge of the second side wall to obtain a connection between the first and second chambers.

17. The acoustic element of a sound absorption structure according to claim 10, wherein the first side wall comprises a third series of slits extending from its first edge.

18. The acoustic element of a sound absorption structure according to claims 15, wherein the first side wall comprises a third series of slits extending from its first edge, and
   wherein the third series of slits have a length greater than the given height of the contact joining zone.

19. The acoustic element of a sound absorption structure according to claim 10, wherein the acoustic element comprises a third chamber, positioned between the first and second chambers, and comprising a side wall delimited by a first edge, connected to at least one of the first and second chambers, as well as by a second edge, opposite the first edge, that defines an edge of an acoustic orifice.

20. A sound absorption structure comprising at least one acoustic element according to claim 10.

21. An aircraft powerplant comprising at least one sound absorption structure according to claim 20.

* * * * *